US010343235B2

(12) United States Patent
Kamitani et al.

(10) Patent No.: US 10,343,235 B2
(45) Date of Patent: Jul. 9, 2019

(54) LASER WELDING METHOD, LASER WELDING APPARATUS, AND CYLINDRICAL BODY

(71) Applicant: MITSUBISHI HEAVY INDUSTRIES, LTD., Tokyo (JP)

(72) Inventors: Keisuke Kamitani, Tokyo (JP); Shuho Tsubota, Tokyo (JP); Takafumi Aoyama, Tokyo (JP); Yasuyuki Fujiya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 573 days.

(21) Appl. No.: 15/022,263

(22) PCT Filed: Jan. 29, 2014

(86) PCT No.: PCT/JP2014/051968
§ 371 (c)(1),
(2) Date: Mar. 16, 2016

(87) PCT Pub. No.: WO2015/056453
PCT Pub. Date: Apr. 23, 2015

(65) Prior Publication Data
US 2016/0228989 A1 Aug. 11, 2016

(30) Foreign Application Priority Data
Oct. 15, 2013 (JP) .................. 2013-215063

(51) Int. Cl.
*B23K 26/282* (2014.01)
*B23K 33/00* (2006.01)
(Continued)

(52) U.S. Cl.
CPC .......... *B23K 26/282* (2015.10); *B23K 26/062* (2015.10); *B23K 26/0823* (2013.01);
(Continued)

(58) Field of Classification Search
CPC .. B23K 26/282; B23K 26/702; B23K 26/062; B23K 26/0823; B23K 37/0538; B23K 33/006; F16L 9/02
(Continued)

(56) References Cited

U.S. PATENT DOCUMENTS

2004/0188394 A1 9/2004 Becker et al.
2012/0061357 A1 3/2012 Ramsayer et al.

FOREIGN PATENT DOCUMENTS

JP 3-285786 A 12/1991
JP 9-216057 A 8/1997
(Continued)

OTHER PUBLICATIONS

Office Action dated Jan. 4, 2017, issued in counterpart Japanese Patent Application No. 2013-215063, with Englis translation. (7 pages).
(Continued)

*Primary Examiner* — Samuel M Heinrich
(74) *Attorney, Agent, or Firm* — Westerman, Hattori, Daniels & Adrian, LLP (57) ABSTRACT

A laser welding method of the present invention is a laser welding method for irradiating with a laser beam a groove portion 6 formed along a circumferential direction by butting axial end portions of cylindrical bodies 5a, 5b together to weld the groove portion, the method comprising: a welding process S2 of irradiating the groove portion 6 with the laser beam over the entire circumference to weld the groove portion; and a strain correction process S4 of irradiating the groove portion 6 with the laser beam over the entire circumference, the laser beam having a heat input amount smaller than a heat input amount per unit area of the laser beam emitted in the welding process S2.

8 Claims, 5 Drawing Sheets

(51) Int. Cl.
- *B23K 26/70* (2014.01)
- *B23K 26/062* (2014.01)
- *B23K 26/08* (2014.01)
- *B23K 37/053* (2006.01)
- *F16L 9/02* (2006.01)
- *C21D 9/08* (2006.01)
- *C21D 9/50* (2006.01)
- *B23K 26/352* (2014.01)
- *B23K 101/06* (2006.01)

(52) U.S. Cl.
CPC .......... *B23K 26/352* (2015.10); *B23K 26/702* (2015.10); *B23K 33/006* (2013.01); *B23K 37/0538* (2013.01); *C21D 9/08* (2013.01); *C21D 9/50* (2013.01); *F16L 9/02* (2013.01); *B23K 2101/06* (2018.08)

(58) Field of Classification Search
USPC ............... 296/146.7; 219/121.63, 121.64
See application file for complete search history.

(56) References Cited

FOREIGN PATENT DOCUMENTS

| | | |
|---|---|---|
| JP | 9-295136 A | 11/1997 |
| JP | 10-272586 A | 10/1998 |
| JP | 2012-521894 A | 9/2012 |

OTHER PUBLICATIONS

Extended (supplementary) European Search Report dated Apr. 11, 2017, issued in counterpart European Patent Application No. 14853681.6. (8 pages).
International Search Report dated Apr. 22, 2014, issued in counterpart International Application No. PCT/JP2014/051968 (1 page).
Written Opinion of the International Searching Authority dated Apr. 22, 2014, issued in counterpart International Application No. PCT/JP2014/051968 (4 pages).
English translation of Written Opinion of the International Searching Authority dated Apr. 22, 2014, issued in counterpart International Application No. PCT/JP2014/051968 (5 pages).

LASER WELDING METHOD, LASER WELDING APPARATUS, AND CYLINDRICAL BODY

FIELD

The present invention relates to a laser welding method for welding a groove portion formed by butting axial end portions of cylindrical bodies together, a laser welding apparatus, and a cylindrical body.

BACKGROUND

Conventionally, welding apparatuses for performing butt welding of a tube by the use of a welding torch rather than laser welding have been known (for example, see Patent Literature 1). In this welding apparatus, multi-layer welding is performed on a groove portion formed by butting the tubes, while supplying a wire and a shield gas to the welding torch. That is, the welding apparatus performs the welding on the groove portion by a plurality of welding passes. At this time, in order to suppress the slope deformation (a welding falling deformation) of the other tube with respect to one tube due to the welding, the welding apparatus measures an amount of deformation after welding of the first layer, and sets a starting point of welding or heating of the next layer to an opposite position of the maximum displacement point on the basis of the measured amount of deformation.

CITATION LIST

Patent Literature

Patent Literature 1: Japanese Laid-open Patent Publication No. 9-216057

SUMMARY

Technical Problem

Incidentally, in the laser welding, welding is performed by irradiating with a laser beam the groove portion formed by butting the axial end portions of the cylindrical bodies together over the entire circumference thereof, that is, by irradiating the groove portion with the laser beam once. Therefore, in the laser welding, since welding is not performed by the plurality of welding passes as in the welding apparatus described in Patent Literature 1, it is difficult to suppress the welding falling deformation.

Thus, an object of the present invention is to provide a laser welding method capable of suppressing the welding falling deformation of the cylindrical body due to the laser welding, a laser welding apparatus and a cylindrical body.

Solution to Problem

According to an aspect of the present invention, a laser welding method for irradiating a groove portion formed along a circumferential direction by butting axial end portions of cylindrical bodies with a laser beam to weld the groove portion, includes: a welding process of irradiating the groove portion with the laser beam over the entire circumference to weld the groove portion; and a strain correction process of irradiating the groove portion with the laser beam over the entire circumference. The laser beam used in the strain correction process has a heat input amount smaller than a heat input amount per unit area of the laser beam emitted in the welding process.

According to this configuration, by irradiating the groove portion subsequent to the welding with a laser beam over the entire circumference thereof again after performing the laser welding over the entire circumference of the groove portion of the cylindrical body, heat can be applied to the groove portion after the laser welding. Therefore, at the time of laser welding, since the amount of deformation of the welding falling deformation on the other cylindrical body with respect to one cylindrical body can be reduced by performing the heat input to the entire circumference of the groove portion after the laser welding, it is possible to suppress the welding falling deformation of the cylindrical body.

Advantageously, in the laser welding method, a surface temperature of the groove portion heated by the laser beam in the strain correction process is a temperature at which a residual plastic strain occurs.

According to this configuration, since the heat input amount to the groove portion after the welding can be set to a heat input amount capable of suppressing the welding falling deformation of the cylindrical body, it is possible to suitably suppress the welding falling deformation of the cylindrical body.

Advantageously, in the laser welding method, a surface temperature of the groove portion heated by the laser beam in the strain correction process becomes higher than a temperature at which a residual plastic strain occurs.

According to this configuration, by generating a new residual plastic strain on the cylindrical body after welding, it is possible to correct the welding falling deformation of the cylindrical body.

Advantageously, in the laser welding method, in the strain correction process, a distance between a focal point of the laser beam and the groove portion is longer than that of the welding process.

According to this configuration, by keeping the focal point of the laser beam away from the groove portion, it is possible to easily reduce the heat input amount per unit area.

Advantageously, in the laser welding method, in the welding process, a plastic strain region is formed around the groove portion by irradiating the groove portion with the laser beam, and in the strain correction process, an irradiation width in the axial direction of the laser beam is longer than an irradiation width in the axial direction of the plastic strain region.

According to this configuration, it is possible to apply heat to a region wider than the plastic strain region using the laser beam. Therefore, it is possible to suppress the welding falling deformation of the cylindrical body, and it is possible to reduce the residual stress generated in the plastic strain region due to the laser welding.

According to another aspect of the present invention, a laser welding apparatus includes: a holding jig that holds cylindrical bodies in a state of butting axial end portions of the cylindrical bodies together; a laser welding unit that irradiates a groove portion formed along a circumferential direction by butting the axial end portions of the cylindrical bodies with a laser beam; and a control unit that controls the laser welding unit. The control unit controls the laser welding unit to irradiate the groove portion with the laser beam over the entire circumference to weld the groove portion, and to irradiate the groove portion with the laser beam over the entire circumference again after reducing a heat input amount per unit area of the laser beam.

According to this configuration, by irradiating the groove portion with a laser beam over the entire circumference thereof again after performing the laser welding over the entire circumference of the groove portion of the cylindrical body, it is possible to apply heat to the groove portion after the laser welding. Therefore, at the time of laser welding, since the amount of deformation of the welding falling deformation on the other cylindrical body with respect to one cylindrical body can be reduced by performing the heat input to the entire circumference of the groove portion after the laser welding, it is possible to suppress the welding falling deformation of the cylindrical body.

Advantageously, in the laser welding apparatus, the control unit sets a surface temperature of the groove portion heated by the laser beam to a temperature at which a residual plastic strain occurs.

According to this configuration, since the heat input amount to the groove portion after the welding can be set to an heat input amount capable of suppressing the welding falling deformation of the cylindrical body, it is possible to suitably suppress the welding falling deformation of the cylindrical body.

Advantageously, in the laser welding apparatus, the control unit sets a surface temperature of the groove portion heated by the laser beam to be higher than a temperature at which a residual plastic strain occurs.

According to this configuration, by generating a new residual plastic strain on the cylindrical body after welding, it is possible to correct the welding falling deformation of the cylindrical body.

Advantageously, in the laser welding apparatus, the control unit sets a distance between a focal point of the laser beam and the groove portion after welding to be longer than a distance between the focal point of the laser beam and the groove portion at the time of welding.

According to this configuration, by keeping the focal point of the laser beam away from the groove portion, it is possible to easily reduce the heat input amount per unit area.

Advantageously, in the laser welding apparatus, the control unit forms a plastic strain region around the groove portion by irradiating the groove portion with the laser beam at the time of welding, and the control unit sets an irradiation width in the axial direction of the laser beam to be longer than an axial width of the plastic strain region.

According to this configuration, it is possible to apply heat to a region wider than the plastic strain region using the laser beam. Therefore, it is possible to suppress the welding falling deformation on the cylindrical body, and it is possible to reduce the residual stress generated in the plastic strain region due to the laser welding.

According to still another aspect of the present invention, a cylindrical body that is welded uses any one of the laser welding apparatus described above.

According to this configuration, it is possible to provide a cylindrical body with a small amount of deformation of the welding falling deformation.

DESCRIPTION OF EMBODIMENTS

Hereinafter, embodiments according to the present invention will be described in detail based on the drawings. Incidentally, the present invention is not limited by these embodiments. In addition, constituent elements in the following embodiments include elements easily replaceable by those skilled in the art or the substantially identical elements.

First Embodiment

Figure 1:
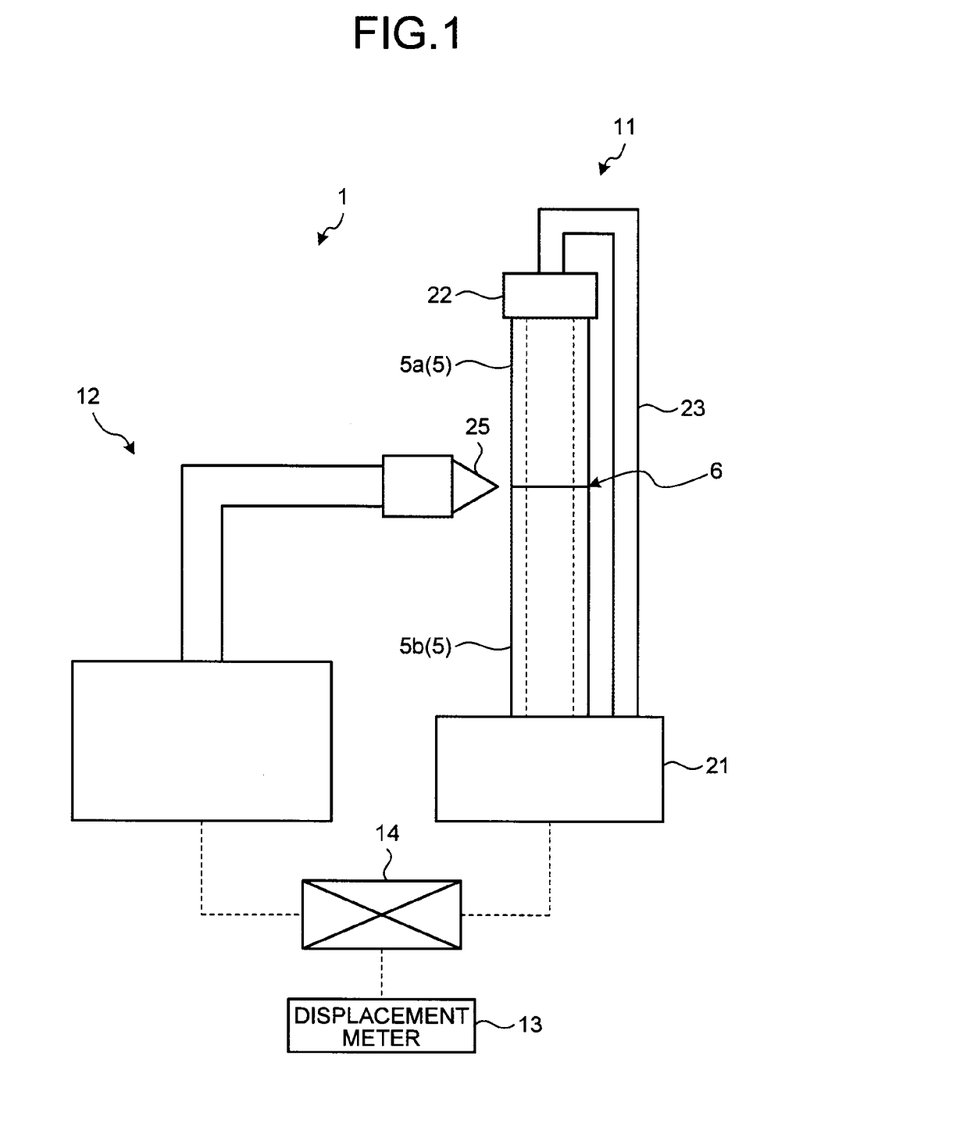
FIG. 1 is a schematic diagram of a laser welding apparatus according to a first embodiment.
Figure 2:
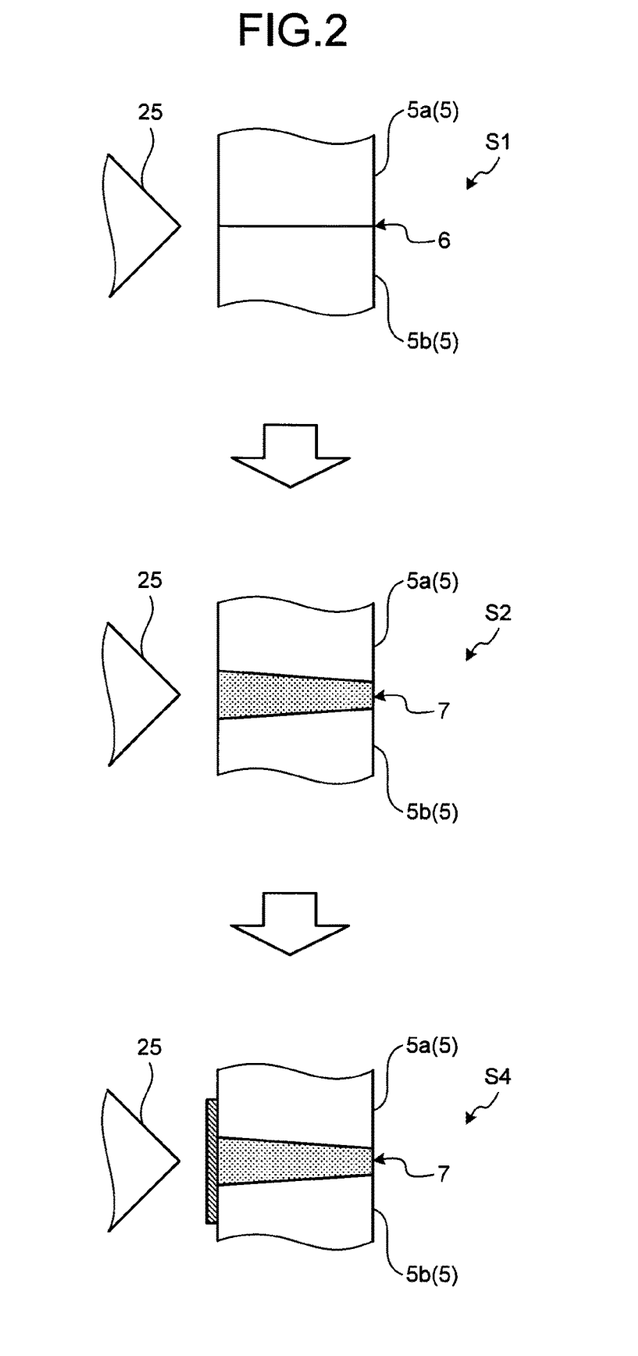
FIG. 2 is an explanatory diagram of a cylindrical body to be subjected to laser welding.
Figure 3:
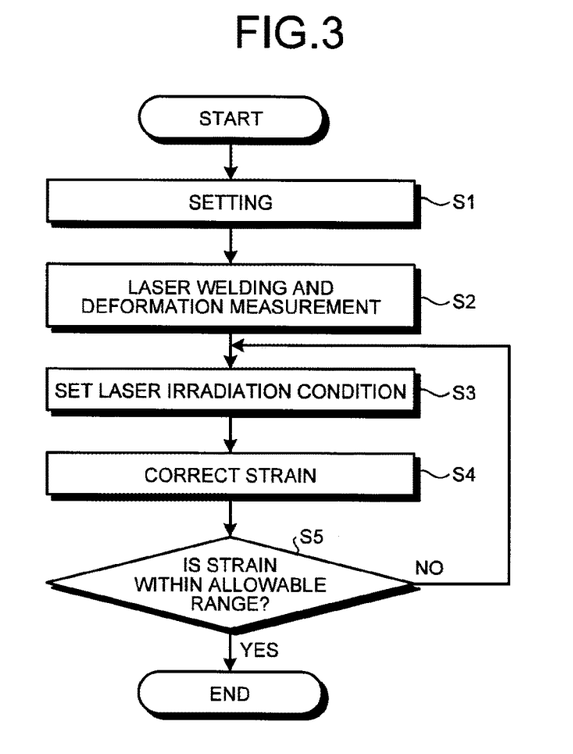
FIG. 3 is a flowchart of a laser welding method using the laser welding apparatus according to the first embodiment.

FIG. 1 is a schematic diagram of a laser welding apparatus according to a first embodiment, FIG. 2 is an explanatory diagram of a cylindrical body to be subjected to laser welding, and FIG. 3 is a flowchart of a laser welding method using the laser welding apparatus according to the first embodiment.

As illustrated in FIG. 1, a laser welding apparatus 1 according to the first embodiment joins a pair of butted cylindrical bodies 5 through the laser welding. Here, a pair of cylindrical bodies 5 as a welding target will be described.

The pair of cylindrical bodies 5 is disposed such that an axial direction thereof becomes a vertical direction, and a lower end portion of a cylindrical body 5a of a vertically upper side and an upper end portion of a cylindrical body 5b of a vertically lower side are butted to each other. Further, by butting the lower end portion of the cylindrical body 5a with the upper end portion of the cylindrical body 5b, a circumferentially extending annular groove portion 6 is formed. Further, when the groove portion 6 of the pair of cylindrical bodies 5 is irradiated with a laser beam along a circumferential direction from an outer circumferential side of the cylindrical body 5 using the laser welding apparatus 1, the laser welding is performed. Incidentally, the cylindrical body 5 as a welding target of the laser welding apparatus 1, for example, is an instrumentation guide pipe or the like provided in a reactor vessel.

Next, the laser welding apparatus 1 will be described referring to FIG. 1. The laser welding apparatus 1 is provided with a holding jig 11 that holds the pair of cylindrical bodies 5, a laser welding unit 12 that irradiates the groove portion 6 with a laser beam, a displacement meter 13 that measures an amount of deformation of the pair of cylindrical bodies 5, and a control unit 14 connected thereto. The laser welding apparatus 1 irradiates the groove portion 6 with a laser beam from the laser welding unit 12, while rotating the pair of cylindrical bodies 5 held by the holding jig 11 around the axis.

Further, although the laser welding apparatus 1 of the first embodiment has a configuration in which the irradiation position of the laser beam emitted from the laser welding unit 12 is fixed to rotate the pair of cylindrical bodies 5, the embodiment is not limited to this configuration. For example, when fixing the pair of cylindrical bodies 5, the laser welding apparatus 1 may be configured to move the laser welding unit 12 along the groove portion 6 of the pair of cylindrical bodies 5.

The holding jig 11 has a rotary table 21 on which the cylindrical body 5b of the lower side is placed, a support member 22 that supports the cylindrical body 5a of the upper side, and a connecting member 23 that connects the rotary table 21 and the support member 22.

The rotary table 21 rotates the placed cylindrical body 5b around the axis, and detects a rotational position. The control unit 14 is connected to the rotary table 21 and adjusts the rotation of the pair of cylindrical bodies 5 by controlling the rotation of the rotary table 21. Further, the control unit 14 acquires the rotational position that is input from the rotary table 21.

The support member 22 is in contact with the upper end portion of the cylindrical body 5a of the upper side, and the pair of cylindrical bodies 5 is interposed between the support member 22 and the rotary table 21. The support member 22 supports the pair of cylindrical bodies 5 to allow the rotation thereof by the rotary table 21. The connecting member 23 connects the rotary table 21 and the support member 22, and fixes the position of the support member 22 with respect to the rotary table 21.

The laser welding unit 12 has a welding head 25 and is capable of emitting laser beams from a tip of the welding head 25. The welding head 25 emits a laser beam in a horizontal direction, and the emitted laser beam is emitted to the groove portion 6. The laser welding unit 12 is connected to the control unit 14, and the control unit 14 controls the laser welding unit 12 to change the focal position of the laser beam or adjust the output of the laser beam.

A displacement meter 13 measures an amount of displacement (an amount of deformation) of the cylindrical body 5a of the upper side with respect to the cylindrical body 5b of the lower side. The displacement meter 13 is connected to the control unit 14, and the control unit 14 acquires the amount of deformation of the welding falling deformation of the pair of cylindrical bodies 5 on the basis of the detection result that is input from the displacement meter 13. Further, the acquired amount of deformation of the welding falling deformation is a displacement in the X-direction and a displacement in the Y-direction of the cylindrical body 5a with respect to the cylindrical body 5b, when a predetermined direction is set as an X-direction and a direction orthogonal to the X-direction is set as a Y-direction in an orthogonal plane that is cut in a plane orthogonal to the axial direction of the cylindrical body 5.

The control unit 14 controls the irradiation of the laser beam from the welding head 25 depending on the rotational position that is input from the rotary table 21 of the holding jig 11. Therefore, the control unit 14 can irradiate a predetermined position in the circumferential direction of the groove portion 6 with a laser beam of predetermined irradiation conditions. In addition, the control unit 14 can set the irradiation conditions of the laser beam using the laser welding unit 12 on the basis of the measurement results of the displacement meter 13. The control unit 14 is able to adjust the heat input amount of the laser beam to the groove portion 6, for example, by adjusting the focal position of the laser beam.

Next, a laser welding method using the above-described laser welding apparatus 1 will be described referring to FIG. 2. In this laser welding method, a welding process of performing the laser welding on the groove portion 6, and a strain correction process of correcting the strain caused by the welding falling deformation by applying a predetermined heat input amount to the groove portion 6 after the welding process are performed.

Here, as illustrated in step S1 of FIG. 2, the groove portion 6 before the laser welding is formed by butting the lower end portion of the cylindrical body 5a of the upper side with the upper end portion of the cylindrical body 5b of the lower side, and the shape of the groove portion 6 has an I-shape with no gap.

The welding process is a process of joining a pair of cylindrical bodies 5 together by irradiating the groove portion 6 with a laser beam over its entire circumference (one rotation). In the welding process, since the pair of cylindrical bodies 5 is joined together, the output of the laser beam, that is, the heat input amount per unit area to the groove portion 6 becomes a heat input amount capable of melting the cylindrical body 5. Specifically, in the welding process, the control unit 14 acquires the rotational position, while rotating the rotary table 21, and emits a laser beam from the welding head 25 depending on the rotational position of the rotary table 21. Further, in the welding process, when it is determined that the rotary table 21 rotates once from the acquired rotational position, the control unit 14 terminates the welding process and shifts to the strain correction process. As illustrated in step S2 of FIG. 2, in the groove portion 6 after the laser welding, when the groove portion 6 is melted by the laser beam irradiation, a welded portion 7 is formed.

The strain correction process is a process of correcting the strain caused by the laser welding, by irradiating the groove portion 6 after welding, that is, the welded portion 7, with a laser beam over the entire circumference (one rotation) thereof. In the strain correction process, since the strain of the pair of cylindrical bodies 5 is corrected, the output of the laser beam, that is, the heat input amount per unit area to the groove portion 6 becomes a heat input amount smaller than that of the welding process. Further, in regard to the adjustment of the heat input amount to the welded portion 7 of the laser beam, the heat input amount may be adjusted by adjusting the output of the laser beam, and the heat input amount may be adjusted by adjusting the focal position of the laser beam.

Here, the heat input amount smaller than that of the welding process is a heat input amount in which a surface temperature of the groove portion 6 subjected to the heat input (heating) by the laser beam becomes a temperature at which the residual plastic strain occurs. Hereinafter, the temperature at which the residual plastic strain occurs will be described.

First, when a stress due to heat is set as $\sigma$, an elastic modulus of a material of the cylindrical body 5 is set as E and the strain caused by heat is set as $\varepsilon$, the stress $\sigma$ is expressed by "$\sigma = E \cdot \varepsilon$". At this time, since the thermal strain is proportional to the temperature increase of the cylindrical body 5, when a linear expansion coefficient of the cylindrical body 5 is set as $\alpha$ and the temperature increase of the cylindrical body 5 is set as T, the thermal strain $\varepsilon$ is expressed by "$\varepsilon = \alpha \cdot T$". Further, when "$\varepsilon = \alpha \cdot T$" is substituted in "$\sigma = E \cdot \varepsilon$", a formula "$\sigma = E \cdot \alpha \cdot T$" is obtained. Here, since an occurrence of residual plastic strain is a case where the stress $\sigma$ becomes a yield stress $\sigma_y$, the temperature increase T of the surface temperature of the groove portion 6 is replaced by a plastic temperature increase $T_p$. As a result, a formula "$\sigma_y = E \cdot \alpha \cdot T_p$" is obtained, and when this is developed by the plastic temperature increase $T_p$, a formula "$T_p = \sigma_y / E \cdot \alpha$" is obtained. Therefore, when the temperature increase T of the surface temperature of the groove portion 6 becomes "$T \geq T_p$", a residual plastic strain occurs. That is, the temperature at which the residual plastic strain occurs is a temperature when the temperature increase T of the surface temperature of the groove portion 6 becomes "$T \geq T_p$".

Furthermore, in the strain correction process, the control unit 14 acquires the rotational position, while rotating the rotary table 21 in the same rotational direction as in the welding process, and emits the laser beam from the welding head 25 depending on the rotational position of the rotary table 21. At this time, as illustrated in step S4 of FIG. 2, the surface of the welded portion 7 (the outer circumferential surface) is irradiated with a laser beam to cover the welded portion 7 in the axial direction. Further, in the strain correction process, when it is determined that the rotary table 21 rotates once from the acquired rotational position, the control unit 14 terminates the strain correction process.

Next, a series of operations in the above-described laser welding method will be described referring to FIG. 3. When performing the laser welding method, first, the pair of cylindrical bodies 5 is positioned and fixed on the holding jig 11 of the laser welding apparatus 1, and the welding head 25 is disposed on the outer circumferential side of the groove portion 6 formed on the pair of cylindrical bodies 5 (step S1: a setting process). After that, the above-described welding process is performed. That is, the control unit 14 joins the pair of cylindrical bodies 5 together by irradiating the groove portion 6 with a laser beam over the entire circumference (one rotation) thereof (step S2: a welding process). Further, in the welding process S2, the control unit 14 also performs measurement of an amount of deformation of the welding falling deformation using the displacement meter 13, while performing the laser welding to the groove portion 6.

Next, the control unit 14 sets the irradiation conditions of a laser beam emitted in the strain correction process S4 to be described later in tandem with the termination of the welding process S2 (an irradiation condition setting process: step S3). In the irradiation condition setting process S3, the irradiation conditions of the laser beam are set within a temperature range in which the surface temperature of the welded portion 7 (the groove portion 6 after welding) becomes a temperature at which the residual plastic strain occurs, and becomes a temperature at which the heat input amount becomes smaller than that of the welding process S2. Further, in the irradiation condition setting process S3, based on the amount of deformation at the displacement meter 13 measured in the welding process S2, that is, the amounts of deformation in the X-direction and the Y-direction, the heat input amount per unit area to the welded portion 7 of the laser beam is adjusted. That is, in the irradiation condition setting process S3, when the amount of deformation of the welding falling deformation is large, while satisfying the above-described temperature range, an irradiation condition is set such that the heat input amount is large. Meanwhile, when the amount of deformation of the welding falling deformation is small, an irradiation condition is set such that the heat input amount is small.

In the irradiation condition setting process S3, when the irradiation conditions of the laser beam are set, the control unit 14 performs the above-described strain correction process. That is, the control unit 14 corrects the strain between the pair of cylindrical bodies 5 by irradiating the groove portion 6 with a laser beam over the entire circumference (one rotation) thereof on the basis of the irradiation conditions that are set in the irradiation condition setting process S3 (step S4: a strain correction process).

Further, after termination of the strain correction process S4, the control unit 14 measures the amount of deformation of the welding falling deformation of the pair of cylindrical bodies 5 using the displacement meter 13. Further, the control unit 14 determines whether the amount of deformation measured by the displacement meter 13 falls within an allowable range of the strain that has been set in advance (step S5: a strain determination process). When it is determined that the measured amount of deformation falls within the allowable range (step S5: Yes), the control unit 14 terminates the laser welding. Meanwhile, when it is determined that the measured amount of deformation does not fall within the allowable range (step S5: No), the control unit 14 proceeds to the irradiation condition setting process S3 again to repeat the strain correction process S4, until the measured amount of deformation falls within an allowable range.

Figure 6:
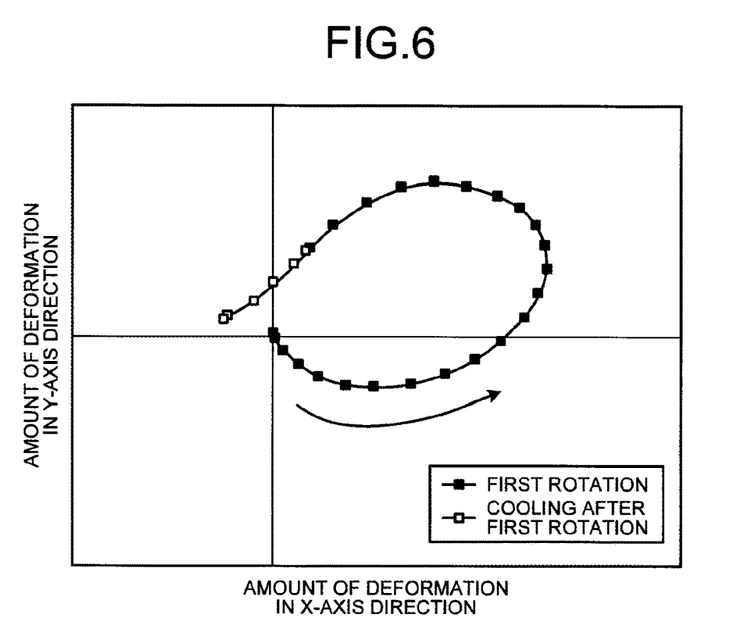
FIG. 6 is a graph illustrating an amount of deformation of a welding slope deformation of the cylindrical body in the case of performing only a welding process.
Figure 7:
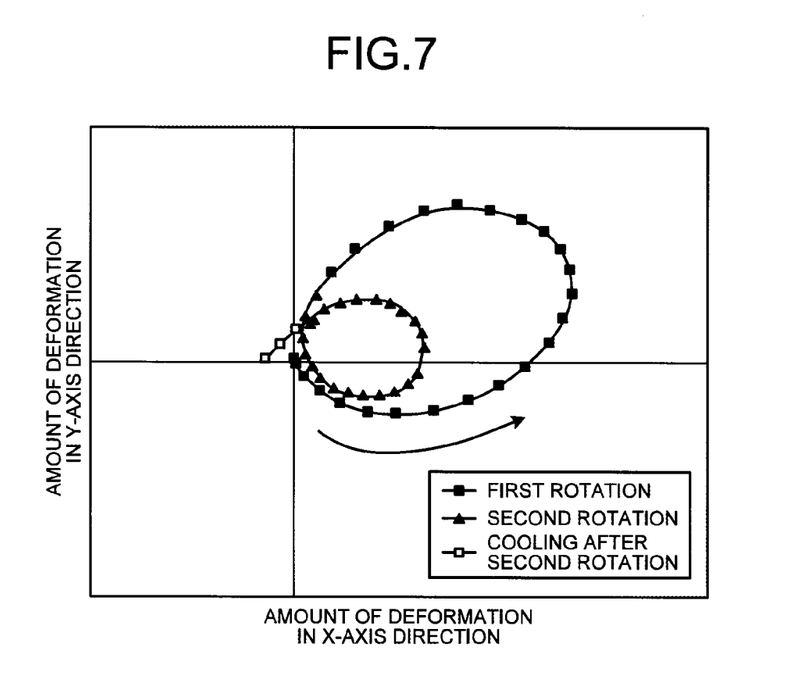
FIG. 7 is a graph illustrating an amount of deformation of the welding slope deformation of the cylindrical body in the case of performing the welding process and strain correction process.

Referring to FIGS. 6 and 7, the amount of deformation of the welding slope deformation of the cylindrical body in the case of performing only the welding process S2 is compared to the amount of deformation of the welding slope deformation of the cylindrical body in the case of performing the welding process S2 and the strain correction process S4. FIG. 6 is a graph illustrating the amount of deformation of the welding slope deformation of the cylindrical body in the case of performing only the welding process, and FIG. 7 is a graph illustrating the amount of deformation of the welding slope deformation of the cylindrical body in the case of performing the welding process and the strain correction process. Further, the graphs illustrated in FIG. 6 and FIG. 7 are data acquired by performing the analysis.

In FIGS. 6 and 7, horizontal axes thereof are the amount of deformation in the X-direction, and vertical axes thereof are the amount of deformation in the Y-direction. In addition, the center point on which the vertical and horizontal axes intersect with each other is an axis center with the cylindrical body 5b of the lower side, and black squares (■), white squares (□) and black triangles (▲) are the axis centers of the cylindrical body 5a of the upper side with respect to the cylindrical body 5b of the lower side.

In the welding method illustrated in FIG. 6, in the welding process S2, a laser beam is emitted around the groove portion 6 once, and thereafter, the welded portion 7 is cooled. In the welding method illustrated in FIG. 7, a laser beam is emitted around the groove portion 6 once in the welding process S2, a laser beam is further emitted around the groove portion 6 (a total of two rotations) once in the strain correction process S4, and thereafter, the welded portion 7 is cooled. When comparing the case illustrated in FIG. 6 with the case illustrated in FIG. 7, it was confirmed that a distance (an amount of deformation) between the axis center of the cylindrical body 5b of the lower side and the axis center of the cylindrical body 5a of the upper side was small in the case illustrated in FIG. 7. Thus, it was confirmed that it was possible to suppress the welding falling deformation of the cylindrical body 5 by performing the strain correction process S4.

As described above, according to the configuration of the first embodiment, after performing the laser welding of the groove portion 6 of the pair of cylindrical bodies 5 over the entire circumference, by irradiating the groove portion 6 (the welded portion 7) after welding again with a laser beam over the entire circumference thereof, it is possible to provide heat to the groove portion 6 after the laser welding. Therefore, since it is possible to reduce the amount of deformation of the welding falling deformation of the other cylindrical body 5 with respect to one cylindrical body 5 at the time of laser welding, by performing the heat input to the entire circumference of the groove portion 6 after the laser welding, it is possible to suppress the welding falling deformation of the cylindrical body 5.

Moreover, according to the configuration of the first embodiment, in the strain correction process S4, the surface temperature of the welded portion 7 subjected to heat input by the laser beam can be set to a temperature at which the residual plastic strain occurs. Therefore, since the heat input amount to the welded portion 7 can be set to a heat input amount capable of suppressing the welding falling deformation of the cylindrical body 5, it is possible to suitably suppress the welding falling deformation of the cylindrical body 5.

Also, according to the configuration of the first embodiment, since it is possible to join a pair of cylindrical bodies 5 by the above-described laser welding method or by the use of the above-described laser welding apparatus, it is possible to provide a cylindrical body 5 with a small amount of deformation of the welding falling deformation.

Second Embodiment

Figure 4:
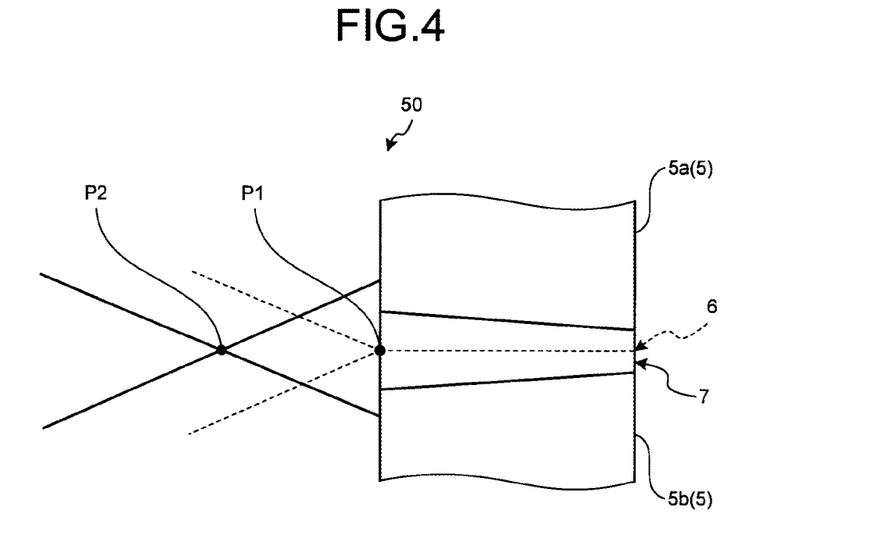
FIG. 4 is a schematic diagram illustrating a part of a laser welding apparatus according to a second embodiment.

Next, a laser welding apparatus 50 according to a second embodiment will be described referring to FIG. 4. FIG. 4 is a schematic diagram illustrating a part of a laser welding apparatus according to the second embodiment. Further, in order to avoid repeated description, differences from the first embodiment will be described in the second embodiment, and portions having the same configurations as in the first embodiment are denoted by the same reference numerals. The laser welding apparatus 50 according to the second embodiment adjusts the focal distance of the laser beam, when the heat input amount of the laser beam is adjusted with respect to the welded portion 7. The laser welding apparatus 50 according to the second embodiment will be described below.

As illustrated in FIG. 4, the laser welding apparatus 50 of the second embodiment adjusts the focal position so that a focal position P1 of the laser beam in the welding process S2 becomes different from a focal position P2 of the laser beam in the strain correction process S4. Specifically, the laser welding unit 12 adjusts the focal position P1 of the laser beam in the welding process S2 to be located on the surface (the outer circumferential surface) of the groove portion 6 (indicated by a dotted line in FIG. 4). Further, the focal position P1 may be located inside the groove portion 6. In contrast, the laser welding unit 12 adjusts the focal position P2 of the laser beam in the strain correction process S4 to be located at a position separated from the welded portion 7 to the outer circumferential side. For this reason, the distance between the focal position P2 and the welded portion 7 in the strain correction process S4 becomes longer than the distance between the focal position P1 and the groove portion 6 in the welding process S2.

As described above, according to the configuration of the second embodiment, by adjusting the focal position P2 of the laser beam away from the welded portion 7 to the outer circumferential side in the strain correction process S4, the laser welding unit 12 can emit the laser beam to cover the welded portion 7 in the axial direction and can reduce the heat input amount per unit area of the laser beam with respect to the welded portion 7. Thus, since the control unit 14 may adjust the focal position without adjusting the output of the laser beam, it is possible to easily adjust the heat input amount.

Third Embodiment

Figure 5:
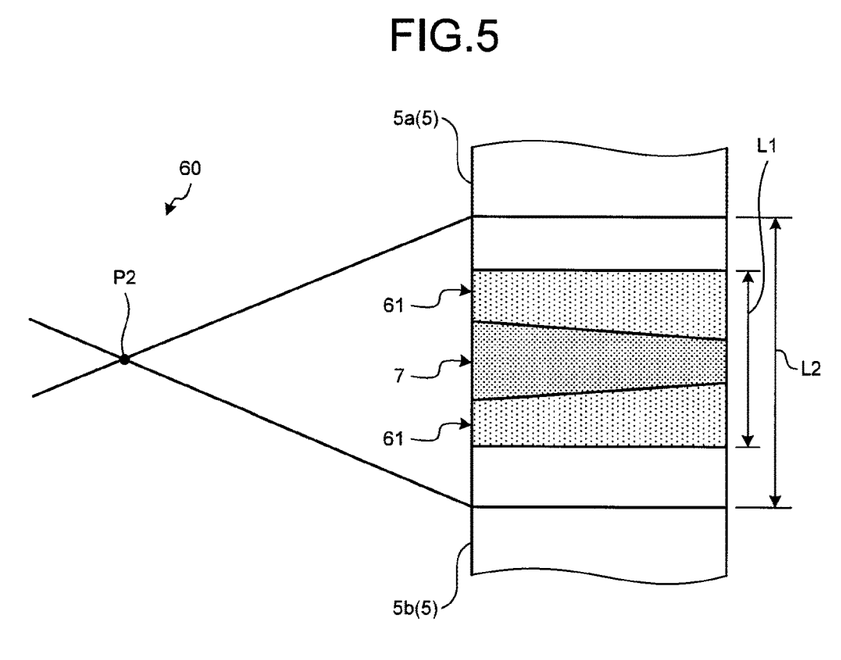
FIG. 5 is a schematic diagram illustrating a part of a laser welding apparatus according to a third embodiment.

Next, a laser welding apparatus 60 according to a third embodiment will be described referring to FIG. 5. FIG. 5 is a schematic diagram illustrating a part of a laser welding apparatus according to the third embodiment. Further, in order to avoid the repeated description, differences from the first and second embodiments will also be described in the third embodiment, and portions having the same configurations as in the first and second embodiments are denoted by the same reference numerals. In the laser welding apparatus 60 according to the third embodiment, an irradiation width in the axial direction of the laser beam with respect to the welded portion 7 has a predetermined irradiation width. The laser welding apparatus 60 according to the third embodiment will be described below.

As illustrated in FIG. 5, in the laser welding apparatus 60 of the third embodiment, plastic strain regions 61 are formed around the circumference of the welded portion 7 welded in the welding process S2. The plastic strain regions 61 are regions capable of being specified on the basis of the surface temperature of the groove portion 6. Specifically, a correlation between the plastic strain region 61 and the surface temperature is represented by a predetermined calculation formula, and the plastic strain region 61 is capable of being specified by substituting the surface temperature for a predetermined calculation formula.

Further, in the laser welding apparatus 60, an axial irradiation width L2 of the laser beam in the strain correction process S4 becomes longer than the axial width L1 of the plastic strain region 61 formed in the welding process S2. At this time, the laser welding apparatus 60 emits a laser beam so that the axial center of the irradiation width L2 of the laser beam becomes an axial center of the welded portion 7.

As described above, according to the configuration of the third embodiment, it is possible to apply heat to a region wider than that of the plastic strain region 61 by the laser beam. Therefore, it is possible not only to suppress the welding falling deformation of the pair of cylindrical bodies 5, but also to reduce the residual stress generated in the plastic strain region 61 due to the laser welding.

REFERENCE SIGNS LIST

1 LASER WELDING APPARATUS
5 CYLINDRICAL BODY
6 GROOVE PORTION
7 WELDED PORTION
11 HOLDING JIG
12 LASER WELDING UNIT
13 DISPLACEMENT METER
14 CONTROL UNIT
21 ROTARY TABLE
22 SUPPORT MEMBER
23 CONNECTING MEMBER
25 WELDING HEAD
50 LASER WELDING APPARATUS (SECOND EMBODIMENT)
60 LASER WELDING APPARATUS (THIRD EMBODIMENT)
61 PLASTIC STRAIN REGION
L1 WIDTH OF PLASTIC STRAIN REGION
L2 IRRADIATION WIDTH OF LASER BEAM

The invention claimed is:

1. A laser welding method for irradiating a groove portion formed along a circumferential direction by butting axial end portions of cylindrical bodies with a laser beam to weld the groove portion, the method comprising:
   a welding process of irradiating the groove portion with the laser beam over the entire circumference to weld the groove portion; and
   a strain correction process of irradiating the groove portion with the laser beam over the entire circumference, wherein the laser beam used in the strain correction process has a heat input amount smaller than a heat input amount per unit area of the laser beam emitted in the welding process, wherein the laser beam of the strain correction process is controlled such that a surface temperature of the groove portion heated by the laser beam becomes equal to or higher than a temperature at which a residual plastic strain occurs, said temperature ($T_p$) being given by an equation $T_p = \sigma_y / E \cdot \alpha$, wherein $\sigma_y$ denotes a yield stress, E denotes an elastic modulus of a material of the cylindrical bodies, and $\alpha$ denotes a linear expansion coefficient of the cylindrical bodies.

2. The laser welding method according to claim 1, wherein in the strain correction process, a distance between a focal point of the laser beam and the groove portion is longer than that of the welding process.

3. The laser welding method according claim 1, wherein in the welding process, a plastic strain region is formed around the groove portion by irradiating the groove portion with the laser beam, and in the strain correction process, an irradiation width in the axial direction of the laser beam is longer than an irradiation width in the axial direction of the plastic strain region.

4. A cylindrical body that is welded by the laser welding method according claim 1.

5. A laser welding apparatus comprising:

a holding jig that holds cylindrical bodies in a state of butting axial end portions of the cylindrical bodies together;

a laser welding unit that irradiates a groove portion formed along a circumferential direction by butting the axial end portions of the cylindrical bodies with a laser beam; and a control unit that controls the laser welding unit, wherein the control unit controls the laser welding unit to irradiate the groove portion with the laser beam over the entire circumference to weld the groove portion, and to irradiate the groove portion with the laser beam over the entire circumference again after reducing a heat input amount per unit area of the laser beam, wherein the laser beam of the control unit is controlled such that a surface temperature of the groove portion heated by the laser beam becomes equal to or higher than a temperature at which a residual plastic strain occurs, said temperature ($T_p$) being given by an equation $T_p = \sigma_y / E \cdot \alpha$, wherein $\sigma_y$ denotes a yield stress, E denotes an elastic modulus of a material of the cylindrical bodies, and a denotes a linear expansion coefficient of the cylindrical bodies.

6. The laser welding apparatus according claim 5, wherein the control unit sets a distance between a focal point of the laser beam and the groove portion after welding to be longer than a distance between the focal point of the laser beam and the groove portion at the time of welding.

7. The laser welding apparatus according claim 5, wherein the control unit forms a plastic strain region around the groove portion by irradiating the groove portion with the laser beam at the time of welding, and the control unit sets an irradiation width in the axial direction of the laser beam to be longer than an axial width of the plastic strain region.

8. A cylindrical body that is welded using the laser welding apparatus according claim 5.

* * * * *